United States Patent
Bilbao de Mendizabal et al.

(10) Patent No.: US 10,823,583 B2
(45) Date of Patent: Nov. 3, 2020

(54) REDUNDANT COMBINATORY READOUT

(71) Applicant: Melexis Technologies SA, Bevaix (CH)

(72) Inventors: Javier Bilbao de Mendizabal, Zurich (CH); Mathieu Poezart, Saint-Aubin-Sauges (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 183 days.

(21) Appl. No.: 16/223,322

(22) Filed: Dec. 18, 2018

(65) Prior Publication Data

US 2019/0195657 A1 Jun. 27, 2019

(30) Foreign Application Priority Data

Dec. 21, 2017 (EP) .................................. 17209661

(51) Int. Cl.
*G01D 5/14* (2006.01)
*G01D 5/244* (2006.01)

(52) U.S. Cl.
CPC ......... *G01D 5/145* (2013.01); *G01D 5/24457* (2013.01)

(58) Field of Classification Search
CPC .......... G01D 5/14; G01D 5/145; G01D 5/244; G01D 5/24457; G01R 33/06; G01R 33/07; G01R 31/3193; G01R 31/31932
See application file for complete search history.

(56) References Cited

U.S. PATENT DOCUMENTS

| | | |
|---|---|---|
| 7,664,619 B2 | 2/2010 | Kameya et al. |
| 8,749,005 B1 | 6/2014 | Foletto et al. |
| 9,523,589 B2 | 12/2016 | Nakamura et al. |
| 9,581,426 B2 | 2/2017 | Okamoto et al. |
| 2013/0021026 A1* | 1/2013 | Ausserlechner ....... G01R 33/07 324/251 |
| 2013/0253864 A1* | 9/2013 | Fujita ................. G01R 33/0005 702/65 |
| 2014/0225596 A1* | 8/2014 | Nakamura ............. G01D 5/145 324/207.2 |
| 2015/0219472 A1 | 8/2015 | Ausserlechner |

(Continued)

FOREIGN PATENT DOCUMENTS

| | | |
|---|---|---|
| DE | 102016202378 A1 | 8/2017 |
| EP | 2264476 A1 | 12/2010 |
| WO | 2015038564 A1 | 3/2015 |

OTHER PUBLICATIONS

European Office Communication from EP Application No. 17209661. 2, dated Apr. 13, 2018.

*Primary Examiner* — Son T Le
(74) *Attorney, Agent, or Firm* — Workman Nydegger

(57) ABSTRACT

The present invention relates to a sensor device comprising four or more sensor elements. A controller comprising a control circuit controls the sensor elements to measure an environment attribute, produces more than two values corresponding to the measurement and compares the values to determine a fault. The more than two values are obtained by different combinations of sensor elements that have at least one sensor element in common and one sensor element that is not in common. The values can be measured in different coordinate systems and the control circuit can convert the field vectors into a common coordinate system.

15 Claims, 9 Drawing Sheets

(56) References Cited

U.S. PATENT DOCUMENTS

2015/0346289 A1* 12/2015 Ausserlechner ... G01R 33/0005
                                                          324/251
2016/0245677 A1   8/2016 Cosgrave et al.
2016/0252599 A1   9/2016 Motz et al.
2016/0299200 A1  10/2016 Taylor et al.

* cited by examiner

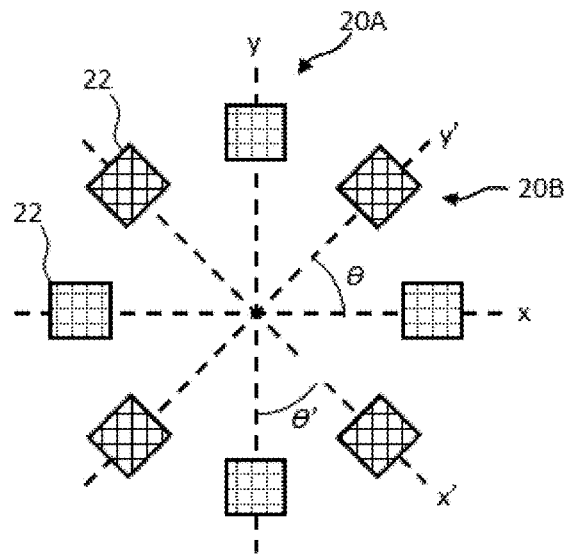
Fig.9
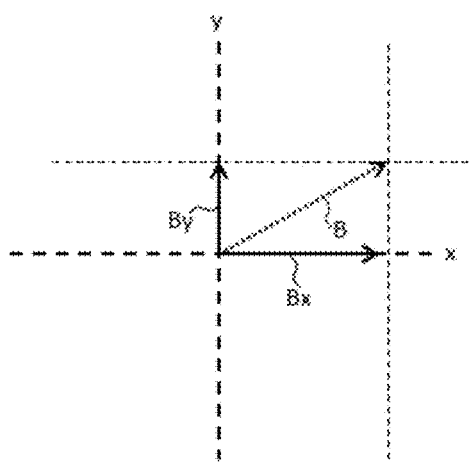 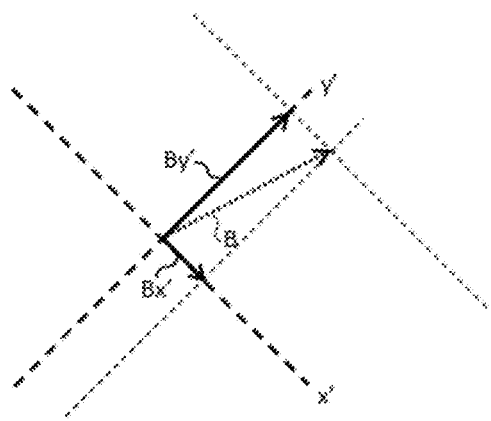
Fig.10  Fig.11

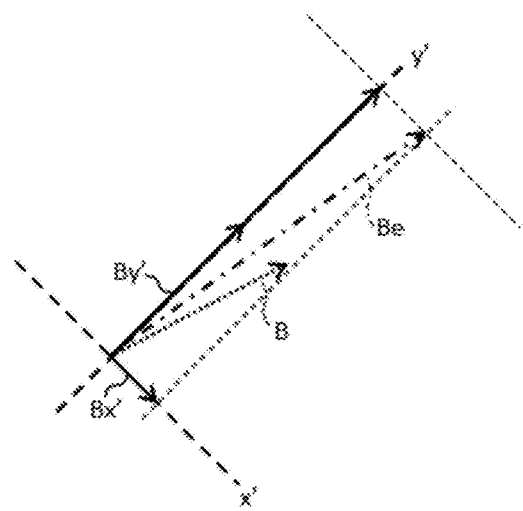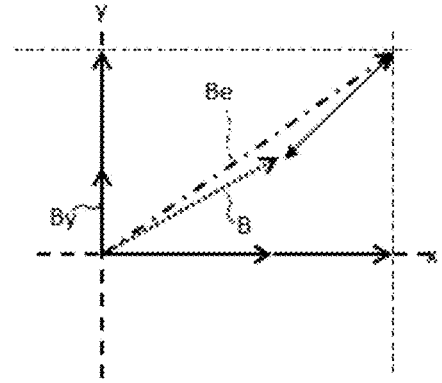
Fig.15A     Fig.15B
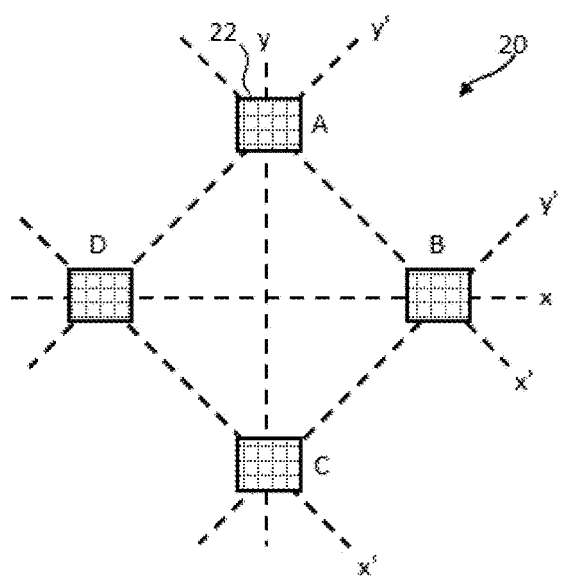
Fig.16

REDUNDANT COMBINATORY READOUT

FIELD OF THE INVENTION

The present invention is generally related to field sensor fault detection structures, circuits, and methods.

BACKGROUND OF THE INVENTION

Sensors are widely used in electronic devices to measure attributes of the environment and report a measured sensor value. In particular, magnetic sensors are used to measure magnetic fields, for example in transportation systems such as automobiles. Magnetic sensors can incorporate Hall-effect sensors that generate an output voltage proportional to an applied magnetic field or magneto-resistive materials whose electrical resistance changes in response to an external magnetic field. In many applications, it is desirable that sensors are small and are integrated with electronic processing circuitry so as to reduce the overall sensor size and provide improved measurements and integration into external electronic systems. For example, application US2016/299200 describes a Hall-effect magnetic sensor for measuring magnetic fields incorporating an integrated circuit formed in a semiconductor material on a substrate, together with insulation and adhesive layers.

Measurements from sensors can drift over time, providing varying measurements even when exposed to the same field. For example, field measurements can be offset from a desired nominal value, the sensitivity can vary so that measurements are a multiple (either greater or less than one) of the desired value, or both. Such variation can be the result of changes in environmental conditions, for example temperature or humidity, or operational factors, such as vibration or aging. Moreover, devices can fail over time for similar reasons. Furthermore, the materials from which sensors are made can have defects that affect the accuracy, offset bias, or symmetry of the sensor's response.

It is important, therefore, to include diagnostic capabilities to detect faults or failures in complex, safety-critical systems, such as automotive systems, so that repairs can be performed or replacements can be provided for any faulty or failed sensor devices. For example, WO2015/038564 describes a method for verifying measurements from a magnetic Hall-effect sensor in a Hall-effect sensor system. In this approach, the Hall-effect sensor is excited with an excitation current having a first value. A first measurement corresponding to a voltage output of the Hall-effect sensor when the Hall-effect sensor is excited with the excitation current having the first value is obtained. Additionally, the Hall-effect sensor is excited with the excitation current having a second value, the second value different than the first value. A second measurement corresponding to a voltage output of the Hall-effect sensor when the Hall-effect sensor is excited with the excitation current having the second value is obtained. Operation of the Hall-effect sensor is then verified based at least on the first measurement and the second measurement.

Another approach to managing diagnostics in a magnetic field sensor is described in US2016/252599. This design uses switches associated with a magnetic field sensor that provide error information. In particular, a device is provided that includes a magnetic field sensor, a plurality of switches associated with the magnetic field sensor, and a control circuit configured to control the plurality of switches and to provide at least one signal indicative of a fault based on operation of the switches.

U.S. Pat. No. 9,523,589 describes a rotation angle measurement apparatus having four Hall element pairs for detecting magnetic field components in four different directions and used to calculate the position of a rotating magnet. The angles of the detected field components are compared to determine faults. In this design the amplitude calculation unit calculates a first amplitude value M representing the magnetic field strength from the rotating magnet based upon the strengths of the output signals from the first Hall element pair and the second Hall element pair, and calculates a second amplitude value Mc representing the magnetic field strength from the rotating magnet based upon the strengths of the output signals from the third Hall element pair and the fourth Hall element pair. Thus, the amplitude calculation unit calculates plural pieces of the amplitude information based upon the output signals from the plural pairs of Hall elements (i.e., magnetic sensors); the output signals correspond to the plural pieces of rotation angle information and the fault is determined by a comparison of the plural pieces of rotation angle information and, in some versions with the strength of the rotating element field.

U.S. Pat. No. 8,749,005 describes a magnetic field sensor with a plurality of polygonally arranged vertical Hall elements. U.S. Pat. No. 9,581,426 discloses a magnetic field measuring device having four magneto-electric transducers on a magneto-sensing surface. U.S. Pat. No. 7,664,619 describes a fault detection unit for a rotation angle detecting device by comparing the measured values to normal ranges and otherwise determines faults.

Since field sensors are subject to operating or structural faults or defects in the sensor materials or devices that lead to incorrect field measurements, there is a need for circuits and methods in sensor devices and systems that operate and test the sensor devices and systems to detect or correct faults in the sensor under critical operating conditions.

SUMMARY OF THE INVENTION

It is an object of embodiments of the present invention to provide for a sensor device capable of redundant measurements of a same physical quantity using different sensor arrangements.

The above objective is accomplished by the solution according to the present invention.

Embodiments of the present invention provide a field-sensor device comprising a first field sensor disposed in a first orientation, the first field sensor responsive to an external field to produce a first sensor signal, a second field sensor disposed in a second orientation different from the first orientation, the second field sensor responsive to the external field to produce a second sensor signal, and a controller having a control circuit that controls the first and second field sensors to produce corresponding first and second sensor signals, receives the first and second sensor signals, converts the first or second sensor signal, or both, to equivalent comparable sensor signals in a common orientation, compares the comparable sensor signals to determine a faulty field sensor, if any, and, if a faulty field sensor is determined, optionally provides a faulty sensor signal and determines which of the first and second field sensors is faulty or, if a faulty sensor is not determined, provides an output sensor signal responsive to the first, second, or comparable sensor signals.

According to embodiments of the present invention, a field is an environmental attribute or characteristic that has a magnitude and a direction, for example a vector field. In various embodiments the field can be a magnetic field, a pressure field, an electric field or a gravitational field and the field sensor can be a magnetic field sensor, a pressure field sensor, an electric field sensor or a gravitational field sensor.

In some embodiments of the present invention the first orientation differs from the second orientation in two orthogonal dimensions. In other embodiments of the present invention the first orientation differs from the second orientation in three orthogonal dimensions. The first and second orientations can be corresponding first and second coordinate systems, directions or dimensions. An orientation of a sensor is determined by the axes of measurement provided by the sensor. If a first sensor has a measurement axis that is not co-linear with the measurement axis of a second sensor, the first and second sensors have different orientations in at least the dimension defined by the measurement axis.

In some configurations the control circuit includes a storage circuit for storing any one or more of the first sensor signal, the second sensor signal and any comparable sensor signal. In some configurations the control circuit includes a conversion circuit (e.g., a computer with a stored software program) for converting either or both of the first sensor signal and the second sensor signal to a different orientation or coordinate system. In some configurations the control circuit includes a comparison circuit for comparing any one or more of the first sensor signal, the second sensor signal and any comparable sensor signal.

In some embodiments the first or second field sensor is an angular field sensor that comprises one or more sensor elements, pairs of sensor elements, or is a bridge sensor having multiple sensor elements that can measure the angle of a field vector with respect to a coordinate system. Each sensor element or pair of sensor elements can measure a field vector in a particular direction and the sensor elements or pairs of sensor elements in a common angular field sensor can be arranged orthogonally to measure the field in different directions, thus providing an angular measurement with respect to the coordinate system. For example, a first angular field sensor can measure a field having a direction and magnitude and provide an angular sensor measurement having two components, for example Bx, By according to a first coordinate system. A second angular field sensor can measure the same field and provide an angular sensor measurement having two components, for example Bx', By' according to a second coordinate system different from the first coordinate system. The two measurements, taken in different coordinate systems, can be compared by converting them to a common, comparable coordinate system, for example by converting the Bx' and By' measurements to the first coordinate system, by converting the Bx and By measurements to the second coordinate system, or by converting both the Bx and By measurements and the Bx' and By' measurements to a third, common coordinate system.

In some configurations the first and second field sensors are disposed on a device substrate comprising a substrate material and the first or second field sensors comprise one or more sensor materials at least partially different from the substrate material. The substrate material can be a semiconductor and the control circuit can be at least partially formed in or on the semiconductor substrate. The control circuit can comprise a control-circuit material that is at least partially different from the substrate material and the control circuit can be disposed on the substrate.

A method of diagnosing a field-sensor device according to an embodiment of the present invention comprises providing a field-sensor device, providing electrical power to the field-sensor device, using the control circuit to control the first and second field sensors to produce respective first and second sensor signals, using the control circuit to receive the first and second sensor signals, using the control circuit to convert the first or second sensor signal, or both, to equivalent comparable sensor signals in a common orientation, and using the control circuit to compare the comparable sensor signals and determine if the first or second field sensor is faulty, and if a faulty field sensor is determined, using the control circuit to provide a faulty sensor signal responsive to the comparable sensor signals and, optionally, to determine which of the first and second field sensors is faulty, or if a faulty field sensor is not determined, using the control circuit to provide an output sensor signal responsive to the first, second, or comparable sensor signals. If the second field sensor is faulty, an output sensor signal that is the first sensor signal or is derived from the first sensor signal can be provided. If the first field sensor is faulty, an output sensor signal that is the second sensor signal or is derived from the second sensor signal can be provided. Thus, field-sensor devices of the present invention can continue to operate even when one of the field sensors has failed by identifying the failed field sensor and using sensor signals from a remaining other field sensor.

In some embodiments the first sensor or the second sensor comprises two or more sensor elements and, if one of the first or second sensors is faulty, which of the two or more sensor elements is faulty, is determined by comparing and categorizing the different measurements of the first and second sensors, where the first sensor measures the field in x and y dimensions and the second sensor measure the field in x' and y' dimensions different from the x, y dimensions. If the measurements are converted to the first coordinate system and the difference is in the x direction, then the x-sensor element of the first sensor is faulty. If the difference is in the y direction, then the y-sensor element of the first sensor is faulty. If the difference is in the x' direction, then the x'-sensor element of the second sensor is faulty. If the difference is in the y' direction, then the y'-sensor element of the second sensor is faulty. A difference can be determined when it exceeds a predetermined magnitude threshold, tolerance or margin so that small differences, for example due to manufacturing variability, are not necessary considered to be faults.

In some embodiments the steps are repeated at a first time and the first, second or any comparable sensor signals are stored. The steps are repeated at a second time different from the first time, and any one or more of the stored signals and any one of the first, second or comparable sensor signals of the second time are compared, processed or combined. In other embodiments the comparable sensor signals or signals derived from the first and second sensor signals are combined to provide the output sensor signal. In various embodiments of the present invention the sensor is a magnetic Hall-effect sensor or a magneto-resistive sensor. The sensor can be a bridge sensor, can incorporate a plurality of sensor elements or can incorporate one or more pairs of sensor elements. Pairs of sensor elements can be oriented in different directions or dimensions within a field sensor.

In embodiments of the present invention a sensor device comprises four or more sensor elements and a controller comprising a control circuit that controls the four or more sensor elements to measure an environmental attribute and produce two or more values corresponding to the measurement. Each of the two or more values is obtained from a set of the four or more sensor elements having at least three non-co-linear sensor elements. The control circuit compares the obtained values to determine a fault, if one exists. Each set of sensor elements includes at least one same sensor element in common with the other sets. Each set includes at least one different sensor element not included in the other sets and/or the sets measure the environmental attribute in different orientations.

In some embodiments at least two of any of the sensor elements form a first line in a first coordinate system and at least two of any of the sensor elements form a second line different from the first line in a second coordinate system different from the first coordinate system. A controller comprising a control circuit controls the sensor elements to measure an environmental attribute, for example a field such as a magnetic field, produces more than two values (e.g., field vectors) corresponding to the measurement, and compares the values to determine a faulty value corresponding to a faulty sensor element. In some embodiments at least two of the values are measured in different coordinate systems and the control circuit converts the values into a common coordinate system. In other embodiments the values are measured in a same coordinate system, but the values are determined with at least partly different sensor elements.

In some embodiments the four sensor elements are arranged in a quadrilateral, a rectangle, a square or a circular arrangement and the control circuit combines measurements from pairs of sensor elements defining lines with different directions to produce the measured values.

A method of operating the sensor device of claim 1 comprises using the control circuit to measure an environmental attribute with the sensor elements, combining the sensor element measurements to produce more than two values representing the environmental attribute, and comparing the values (e.g., field vectors such as magnetic field vectors) to determine a fault, if one exists.

In embodiments the values are field vectors and measurements from pairs of sensor elements defining lines with different directions are combined to produce the field vectors and the different directions can be orthogonal. The values or field vectors can be produced in different coordinate systems and can be converted into a common coordinate system.

Embodiments of the present invention provide sensor devices having improved diagnostic capability using smaller and less expensive circuits and can compensate or detect faults or fine defects in the sensor or sensor material. Faults can include, but are not limited to, disconnection, high-resistance connections, short circuits, or material faults. The detection can occur at the same time that the sensor circuit is operating.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The foregoing and other objects, aspects, features, and advantages of the present disclosure will become more apparent and better understood by referring to the following description taken in conjunction with the accompanying drawings.

FIG. 9 is a schematic of field sensors with sensor elements in two different coordinate systems according to illustrative embodiments of the present invention.

FIGS. 10 and 11 are graphic illustrations of a field vector in two different coordinate systems according to illustrative embodiments of the present invention.

FIG. 15A is a graphic illustration of a field vector having an error in the rotated y' coordinate measurement and FIG. 15B is a graphic illustration of the measured field vector of FIG. 15A in the x, y coordinate system according to an illustrative embodiment of the present invention.

FIG. 16 is a graphic illustration of sensor element pairs and different coordinate systems according to an illustrative embodiment of the present invention.

DETAILED DESCRIPTION OF ILLUSTRATIVE EMBODIMENTS

Figure 1:
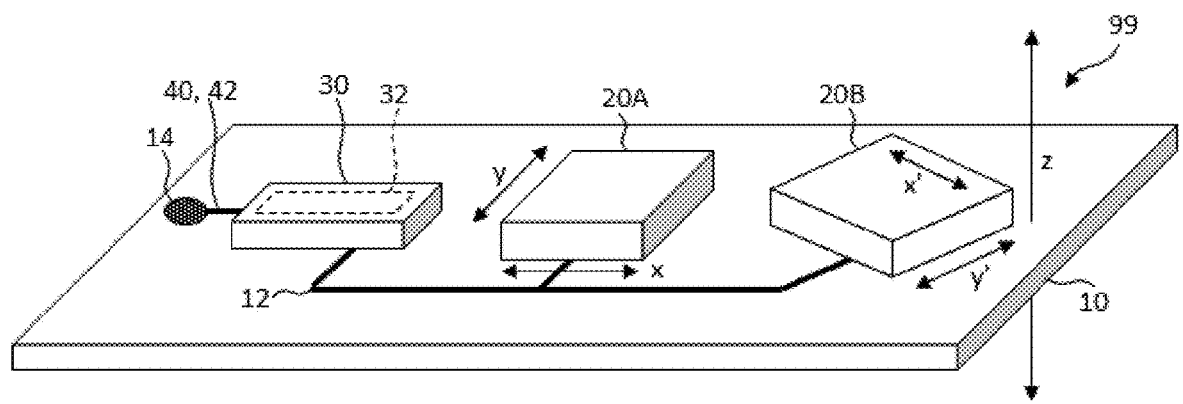
FIG. 1 is a perspective of illustrative embodiments of the present invention.

The present invention will be described with respect to particular embodiments and with reference to certain drawings but the invention is not limited thereto but only by the claims. The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Embodiments of the present invention provide sensor devices having improved diagnostic capability using smaller and less expensive circuits and can compensate for, detect or diagnose faults or fine defects in the sensor material or damage to the sensor while the sensor device is operating. Such defects can be inherent in the material used to make the sensor or can be formed over time, as a result of use or in response to mechanical or other environmental stresses on the sensor. In various embodiments of the present invention sensors can detect fields having vectors comprising a direction and magnitude, for example magnetic fields, electrical fields, pressure fields or gravitational fields.

Figure 2:
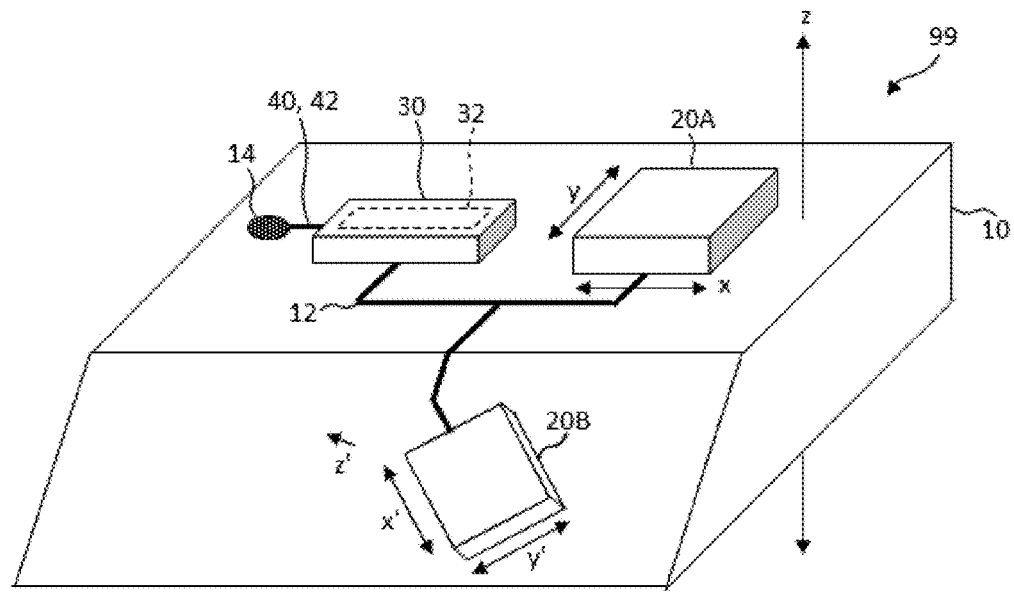
FIG. 2 is a perspective of other illustrative embodiments of the present invention.

Referring to FIG. 1 and FIG. 2, in embodiments of the present invention, a field-sensor device 99 comprises a first field sensor 20A disposed in a first orientation responsive to an external field to produce a first sensor signal and a second field sensor 20B disposed in a second orientation different from the first orientation responsive to the external field to produce a second sensor signal. The first and second field sensors 20A, 20B are referred to collectively as field sensors 20. A controller 30 comprises a control circuit 32 that controls the first and second field sensors 20A, 20B to produce corresponding first and second sensor signals, receives the first and second sensor signals, converts the first or second sensor signal, or both, to equivalent comparable sensor signals in a common orientation or coordinate system, compares the comparable sensor signals to determine if the first or second field sensor 20A, 20B is faulty, and if a faulty field sensor 20 is determined, provides a faulty sensor signal 42 and optionally determines which of the first and second field sensors 20A, 20B is faulty. If a faulty field sensor 20 is not determined, the controller 30 provides an output sensor signal 40 responsive to the first, second, or comparable sensor signals indicating attributes of the sensed field. In various embodiments, the field is a magnetic field, an electrical field, a pressure field, or a gravitational field and the sensors 20 are magnetic field sensors, electrical field sensors, pressure field sensors, or gravitational field sensors. The first and second orientations can also be described as corresponding first and second coordinate systems, directions, or dimensions, for example each having x, y, or z orthogonal dimensions. In other embodiments of the present invention, more than two or more than three field sensors 20 comprise the field-sensor device 99.

Conventionally, comparisons between the measurements of a common field by multiple sensors can indicate a fault in one of the sensors when the measurements differ. However, according to embodiments of the present invention, the first and second field sensors 20 have different orientations so that at least some of their measurement axes are not co-linear and the field sensors 20 therefore provide redundant field measurements in different coordinate systems. Thus, a comparison of the redundant field measurements in a common coordinate system can not only indicate errors or faults in the first or second field sensors 20, but indicate which field sensor 20 is at fault, providing an additional test and check of the field sensors 20. Furthermore, by identifying the failed field sensor, the field-sensor device 99 can continue to operate by using the sensed signals from other field sensors, in contrast to sensor systems that can detect a failure, but cannot continue to operate because the failure cannot be identified or associated with a specific field sensor. In further embodiments comprising more than two field sensors 20, more than two sensor signals can be converted to a common orientation and more than two comparable signals can be compared to determine faulty field sensors 20.

The first field sensor 20A, the second field sensor 20B, and the controller 30 can be disposed on a device substrate 10 and electrically connected with electrical conductors such as wires 12, and can include single wires 12 or buses comprising multiple wires 12 that can communicate power, ground and control signals to or from the field-sensor device 99, the controller 30, the first field sensor 20A or the second field sensor 20B. The field sensors 20 can be Hall-effect field sensors or magneto-resistive sensors and can comprise a compound semiconductor material. Alternatively, the field sensors 20 are electric field sensors, pressure field sensors or gravitational field sensors and can, for example, incorporate micro-electro-mechanical systems (MEMS) devices.

The first and second field sensors 20A, 20B can be disposed in a common plane or on a common surface, as shown in FIG. 1 and, if the first field sensor 20A is rotated with respect to the second field sensor 20B, the first field sensor 20A differs in two orientations (two dimensions or two directions, x, y) from the second field sensor 20B (x', y'), defining different coordinate systems for the first and second field sensors 20. Only the vertical z dimension has the same direction. As shown in FIG. 2, the second field sensor 20B is disposed on a surface that is at an incline of approximately 45 degrees with respect to the surface on which the first field sensor 20A is disposed and is rotated 45 degrees with respect to the first field sensor 20A. Thus, as shown in FIG. 2, the first field sensor 20A is also rotated in the z dimension from the second field sensor 20B so that the first field sensor 20A differs in three orientations (three dimensions or directions, x, y, z) from the second field sensor 20B (x', y', z').

The controller 30 can be a discrete or integrated circuit or include both discrete and integrated components, and the control circuit 32 can be an analog, digital or mixed-signal circuit. The wires 12 can be any patterned electrical conductor, for example a metal, metal alloy, a conductive metal oxide, or a conductive polymer. The device substrate 10 can be any substrate having one or more surfaces on which the first and second field sensors 20A, 20B can be disposed and electrically connected. The controller 30 can also be, but is not necessarily, disposed on a surface of the substrate 10.

The field-sensor device 99 can be electrically connected to an external system through electrical contact pads 14 formed on the device substrate 10 that are electrically connected through wires 12 to the controller 30. Although FIGS. 1 and 2 illustrate the controller 30 as disposed on the device substrate 10, in other embodiments of the present invention, the controller 30 is provided on a substrate or structure (e.g., a printed circuit board) separate from the device substrate 10. Similarly, the first and second field sensors 20A, 20B can be disposed on different substrates, surfaces or devices.

Figure 3:
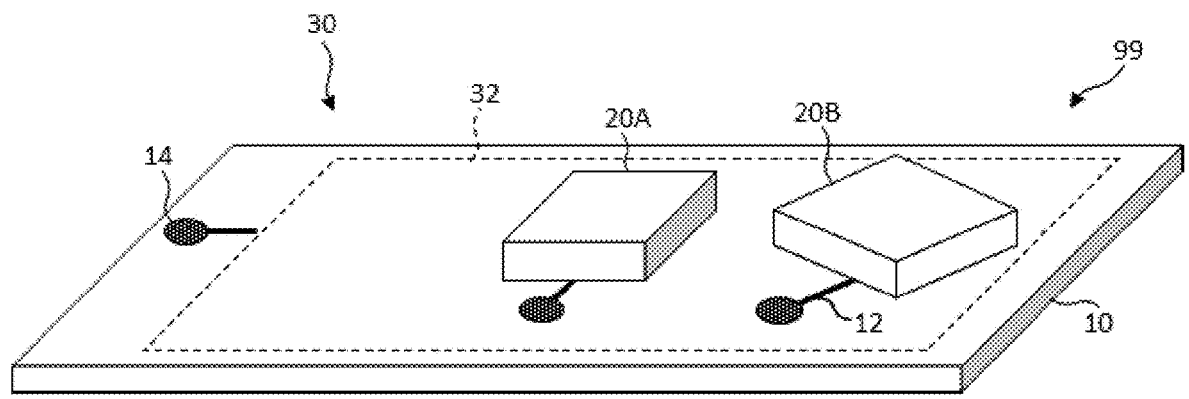
FIG. 3 is a perspective of another illustrative embodiment of the present invention.

Referring to FIG. 3, in some embodiments the device substrate 10 is or comprises a semiconductor substrate comprising at least a portion of the controller 30 and the control circuit 32 is formed in or on the semiconductor substrate. In another embodiment and as shown in FIGS. 1 and 2, the controller 30 is an integrated circuit disposed on the device substrate 10 and the device substrate 10 is a dielectric or has a dielectric layer or surface. Thus, the device substrate 10 can comprise a substrate material that is at least partially different from a material of the first and second field sensors 20A, 20B and is at least partially different from a material of the control circuit 32. In some embodiments the first and second field sensors 20A, 20B comprise compound semiconductors, the controller 30 comprises a silicon semiconductor and the substrate material comprises a dielectric (FIGS. 1 and 2). In another embodiment the first and second field sensors 20A, 20B comprise compound semiconductors and the device substrate 10 material comprises a silicon semiconductor and the control circuit 32 is formed in or as part of the silicon semiconductor (FIG. 3).

Figure 4:
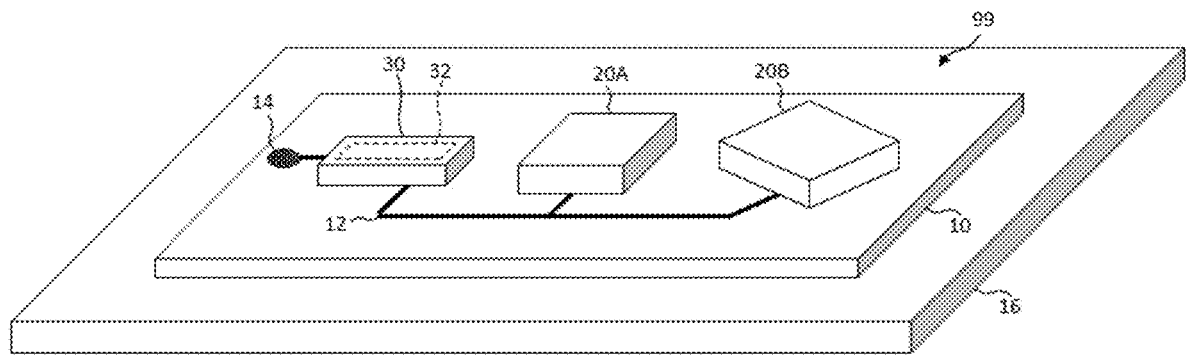
FIG. 4 is a perspective of alternative illustrative embodiments of the present invention.

Referring to FIG. 4, the device substrate 10 can be mounted on a system substrate 16, for example a system substrate 16 of another device or system. Any one of the device substrate 10, the controller 30, the first field sensor 20A or the second field sensor 20B can be a micro-transfer printed component and comprise a fractured, broken or separated tether. The controller 30, the first field sensor 20A, or the second field sensor 20B can be integrated circuits or bare die and can be micro-transfer printed onto the device substrate 10 and the device substrate 10 can be micro-transfer printed onto the system substrate 16.

In embodiments of the present invention the first orientation differs from the second orientation in one dimension, in two dimensions as shown in FIG. 1, or in three dimensions as shown in FIG. 2. In some embodiments the dimensions in each orientation are orthogonal, in other embodiments the dimensions are not orthogonal. For example, FIG. 5A illustrates three orthogonal dimensions (x, y, z) in one orientation or coordinate system, FIG. 5B illustrates three orthogonal dimensions (x', y', z) in another orientation or coordinate system in which the x' and y' dimensions are rotated by 45 degrees with respect to the orientation of FIG. 5A but the z dimension has the same orientation so that the orientation of FIG. 5B differs from the orientation of FIG. 5A in two dimensions.

Figure 5A:
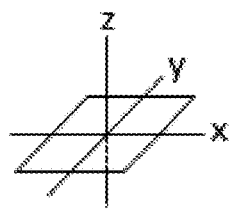
FIG. 5A illustrates a first coordinate system according to embodiments of the present invention.
Figure 5B:
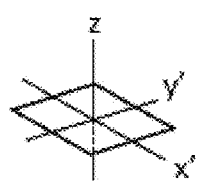
FIG. 5B illustrates a second coordinate system according to embodiments of the present invention.
Figure 5C:
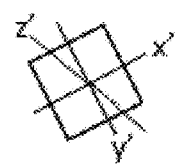
FIG. 5C illustrates a third coordinate system according to embodiments of the present invention.

FIG. 5C illustrates three orthogonal dimensions (x', y', z') in yet another orientation or coordinate system in which the x, y, and z dimensions are all rotated by 45 degrees with respect to FIG. 5A so that the orientation of FIG. 5C differs from the orientation of FIG. 5A in three dimensions. The first and second field sensors 20A, 20B illustrated in FIG. 1 have different first and second orientations corresponding to the different orientations of FIGS. 5A and 5B. The first and second field sensors 20A, 20B illustrated in FIG. 2 have different first and second orientations corresponding to the different orientations of FIGS. 5A and 5C.

Figure 6:
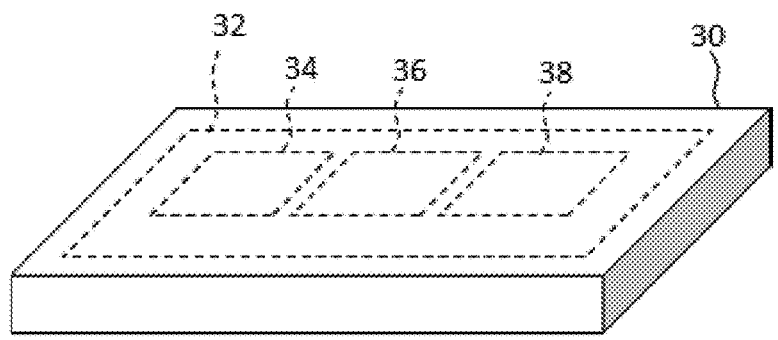
FIG. 6 is a perspective illustration of a controller according to illustrative embodiments of the present invention.

Referring to FIG. 6, the control circuit 32 includes a storage circuit 34 for storing any one or more of the first sensor signal, the second sensor signal and any converted or comparable sensor signal, a conversion circuit 36 for converting the first or second sensor signals to comparable sensor signals and a comparison circuit 38 for comparing any one or more of the first sensor signal, the second sensor signal and any comparable sensor signals or predetermined tolerance, margins or threshold values. The circuits can be, for example, silicon circuits, either analog circuits or digital circuits, for example CMOS circuits.

Figure 7:
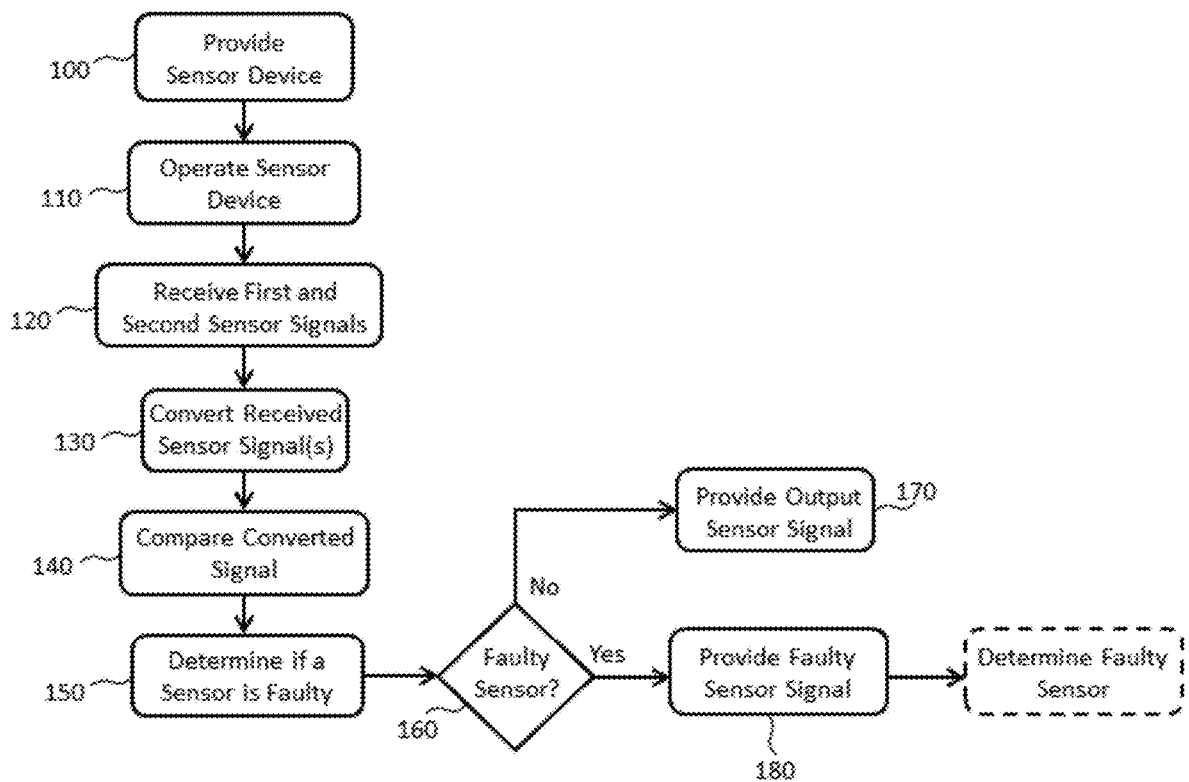
FIG. 7 is a flow chart of a method according to illustrative embodiments of the present invention.

Referring to FIG. 7, according to embodiments of the present invention a field-sensor diagnostic method comprises providing a field-sensor device 99 in step 100 and providing power to the field-sensor device 99 to operate the field-sensor device 99 in step 110. In step 120 the control circuit 32 is used to control the first and second field sensors 20A, 20B to produce first and second sensor signals and receives the respective first and second sensor signals. In step 130 the control circuit 32 is used to convert the received first or second sensor signal, or both, to equivalent comparable sensor signals in a common orientation or coordinate system and compares them in step 140. The control circuit 32 then determines in step 150 if either the first field sensor 20A or the second field sensor 20B is faulty. If a field sensor 20 is faulty (tested in step 160), the control circuit 32 is used to provide a faulty sensor signal 42 responsive to the comparable sensor signals (step 180) and, optionally, to determine which of the first and second field sensors 20A, 20B is faulty (step 190). If a field sensor 20 is not faulty (tested in step 160), the control circuit 32 is used to provide an output sensor signal 40 responsive to or derived from the first, second or comparable sensor signals in step 170. In an embodiment the output sensor signal 40 is a combination, for example an average, of the comparable sensor signals 40 or signals derived from the first and second sensor signals, thus reducing the variability and improving the accuracy and consistency of the output sensor signal 40 (FIGS. 1, 2).

Steps 120 to 150 can be repeatedly performed at different times and the first and second sensor signals stored in the storage circuit 34 and averaged over time or otherwise combined to improve the signal-to-noise ratio of the first and second sensor signals. Alternatively, converted, comparable sensor signals can be stored in the storage circuit 34 and averaged over time or otherwise combined to improve the signal-to-noise ratio of the comparable sensor signals.

In some methods of the present invention, if the second field sensor 20B is faulty, an output sensor signal 40 (FIGS. 1, 2) that is the first sensor signal or is derived from the first sensor signal is provided in step 180, so that the field-sensor device 99 can continue to operate. If the first field sensor 20A is faulty, an output sensor signal 40 (FIGS. 1, 2) that is the second sensor signal or is derived from the second sensor signal is provided in step 180, so that the field-sensor device 99 can continue to operate. Thus, by identifying the failed field sensor 20, the field-sensor device 99 can continue to operate by using sensed signals from other field sensors 20, in contrast to sensor systems that can detect a failure, but cannot continue to operate because no known good field-sensor signal can be identified.

Figure 8:
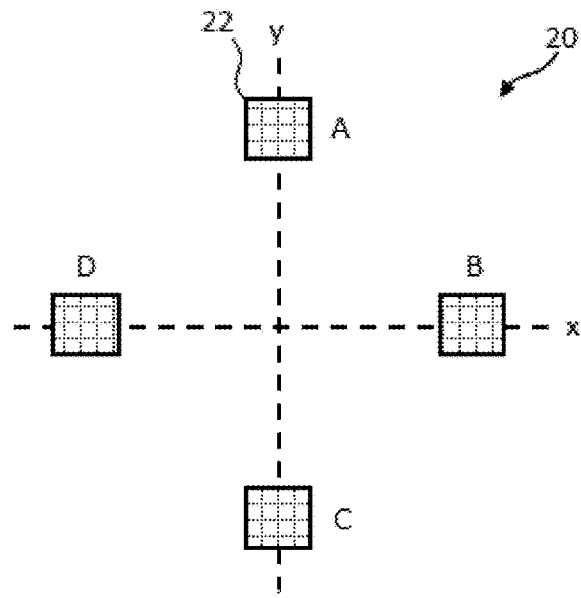
FIG. 8 is a schematic of sensor elements in a coordinate system according to illustrative embodiments of the present invention.

A field sensor 20 can be a sensor element 22 or include a single sensor element 22 or multiple sensor elements 22. Referring to FIG. 8, in embodiments of the present invention, the first field sensor 20A or the second field sensor 20B can comprise one or more sensor elements 22 or one or more pairs of sensor elements 22, for example a pair of Hall-effect sensor elements 22. As shown in FIG. 8, the field sensor 20 comprises four sensor elements 22 arranged in two orthogonal pairs (A, C and B, D) to provide measurements in each of the two dimensions corresponding to the directions of the two orthogonal pairs. Each pair of sensor elements 22 in a direction can provide a measurement of the field in that direction. Thus, in an embodiment of the present invention, either of the first or second field sensors 20A, 20B includes two sensor elements 22 arranged to detect the magnitude of a field in a first dimension or direction and two sensor elements 22 arranged to detect the magnitude of a field in a second dimension or direction different from the first dimension or direction. In some embodiments the first and second dimensions are orthogonal dimensions.

Referring to FIG. 9, the first and second field sensors 20A, 20B are rotated by 45 degrees and arranged in a common plane so that the first orientation differs from the second orientation in two dimensions, and also correspond to the illustrations of FIGS. 1, 3, 4, 5A and 5B, and 8. In configurations of the present invention, correlation between axes of different coordinate systems is maximized at 45 degrees in a Cartesian coordinate system. In other embodiments, other coordinate systems, for example cylindrical, polar, or spherical coordinate systems are used. In general, a measurement is a projection of an actual field onto the coordinate system. In an embodiment, a method of the present invention comprises determining in step 190 (FIG. 7) which of the two or more field sensors 20 is faulty.

In an embodiment of the present invention the first and second field sensors 20A, 20B are spatially offset from each other, as shown in FIGS. 1-4. In another embodiment of the present invention, the first and second field sensors 20A, 20B spatially overlap each other, as shown in FIG. 9. In a further embodiment of the present invention, the spatially overlapping first and second field sensors 20A, 20B have a common centre, also as illustrated in FIG. 9. The first and second field sensors 20A, 20B can be provided in a common structure or device within the field-sensor device 99 of the present invention.

The field sensors 20 can be magnetic sensors such as Hall-effect sensors, magnetoresistive sensors such as extreme magnetoresistive sensors (XMR) extraordinary magnetoresistive sensors (EMR), giant magnetoresistive sensors GMR, tunneling magnetoresistive sensors (TMR), colossal magnetoresistive sensors (CMR) or anisotropic magnetoresistive sensors (AMR).

Any of the elements in the field-sensor device 99 can be analog components, include analog-to-digital convertors or can be digital components. The circuits can include a CPU with a program stored in a memory, a stored program machine, a state machine or the like. Similarly, in various embodiments of the present invention, each of the first and second field sensors 20A, 20B, and the controller 30 can be implemented in a combination of discrete circuit components or integrated circuits or can be integrated into common circuits or common integrated circuits. In some embodiments the first or second field sensors 20A, 20B or the control circuit 32 share circuit components or packages.

The first and second field sensors 20A, 20B, or the control circuit 32 can include electronic circuits, digital logic circuits, analog circuits, or mixed-signal circuits or a combination of circuit types and electronic devices. Portions or all of these circuits can be provided in one or more circuits, in common circuits, in one or more integrated circuits or packages or in common integrated circuits or packages. The various components of the field-sensor device 99 can be, for example, provided in electronic circuits, integrated circuits or discrete electronic devices that are electrically connected with wires 12.

Any one or all of the various components can be disposed on a printed circuit board or on a semiconductor substrate, or any one or all of the various components can be integrated as a circuit in or on the semiconductor substrate, or some combination of integrated circuits provided on the semiconductor substrate and circuits formed in or on the semiconductor substrate. Any one or all of the various components can be provided in packaged integrated circuits or in bare die that are placed or micro-transfer printed onto the semiconductor substrate or other substrate. Wires 12 can be provided using photolithographic methods and materials to connect the various components, integrated circuit dies, or circuits integrated on the semiconductor substrate.

Each of the first or second field sensors 20A, 20B can be any of various magnetic sensors such as Hall-effect sensors or magneto-resistive sensors and can be provided, for example, in an integrated circuit, discrete elements or as separate integrated circuit components (such as bare die) mounted on a sensor device substrate, such as a glass, ceramic, polymer or semiconductor substrate, for example by using pick-and-place, surface-mount or printing techniques. One or more of the integrated circuit components or elements of the field-sensor device 99 such as the controller 30, can be disposed on the first or second field sensor 20A, 20B as bare die deposited by micro-transfer printing and electrically connected. Alternatively, the first or second field sensors 20A, 20B can be disposed on the controller 30 as bare die deposited by micro-transfer printing and electrically connected. The control circuit 32 can be provided as a photolithographically defined circuit in a semiconductor substrate and the first or second field sensor 20A, 20B can be disposed on the semiconductor substrate as bare die and electrically connected to the control circuit 32 using photolithographic processes and materials.

Referring to FIG. 10, an arbitrary and illustrative field vector B is illustrated with respect to the first orientation (first coordinate system) and, referring to FIG. 11, the same field vector B is illustrated with respect to the second orientation (second coordinate system). Since the field vector B is identical in both cases (FIGS. 10 and 11), the first and second sensor signal vectors measured by the first and second field sensors 20A, 20B are equivalent but are not directly comparable (i.e. the magnitude values of the field vectors in each of the measurement axes are different for the first and second orientations). However, since the relative disposition of the first field sensor 20A with respect to the second field sensor 20B can be predetermined when the field-sensor device 99 is constructed (disposed on the substrate 10 surface, FIG. 1), the first sensor signal can be converted (transformed) from the first orientation (first coordinate system) into the second orientation (second coordinate system) and the magnitudes of the field vectors directly compared. Alternatively, the second sensor signal can be converted (transformed) from the second orientation (second coordinate system) into the first orientation (first coordinate system) and the magnitudes of the field vectors directly compared. In yet other embodiments the first sensor signal can be converted into a third orientation (third coordinate system) different from the first and second orientations (first and second coordinate systems) and the second sensor signal can be likewise converted into the third orientation (third coordinate system) so that the magnitudes of the field vectors of the two converted field sensor signals can be directly compared. When the two sensor signals are converted into a common orientation (a common coordinate system), they are comparable signals. This operation can be performed as a matrix transformation with a rotation matrix. Although not required for detecting a sensor fault, in an embodiment in which the faulty sensor is identified, the measurement axes, when projected into another coordinate system, have non-diagonal sub-matrix coefficients in the transformation matrix between axis coordinates where the fault is located.

In the example illustrated in FIG. 9 (corresponding to FIGS. 1, 5A, and 5B), the first and second orientations differ by the angle θ (45°) in the x, y plane parallel to the surface of the device substrate 10 (FIG. 1) and are identical in the z dimension (orthogonal to the common plane on which the first and second field sensors 20A, 20B are disposed), so that the first and second orientations (coordinate systems) in the example of FIG. 9 differ in two dimensions or directions.

A measured field vector in the first coordinate system can have values Bx and By and the same vector measured in the second coordinate system can have values Bx' and By'. Given a known angle θ between two orientations, the x' and y' vectors can be calculated with x'=x cos(θ)+y sin(θ) and y'=y cos(θ)−x sin(θ). The reverse calculation is x=x' cos(θ)−y' sin(θ) and y=y' cos(θ)+x' sin(θ). Conversion to an arbitrary third orientation can be similarly calculated.

In a simplified example in which θ=45°, as in the example of FIGS. 1 and 9, sin(θ)=cos(θ)=1/(2^(1/2))=k≈0.707. The simplified equations that convert from the first coordinate system to the second coordinate system are $$x'=k(x+y),\ y'=k(y-x)$$

and the equations that convert from the second coordinate system to the first coordinate system are $$x=k(x'-y'),\ y=k(y'+x').$$

In any physical implementation, the first and second field sensors 20A, 20B are not necessarily identical and can have limitations in precision and accuracy and acceptable differences between them within a predetermined tolerance. Using orientations that differ by 45° degrees in different dimensions provides a greater magnitude difference in the different dimensions, thereby improving the ability to detect faults in each of the different dimensions, although other angles can be used.

Predetermined measurement tolerance margins can be provided to determine whether measurements from the first and second field sensors 20A, 20B are faulty. The predetermined measurement tolerance margins can be specified in each dimension (Bx, By) or as a combination specifying the single net field measurement (Be). If the comparable sensor signals derived by converting the first and second sensor signals into the same coordinate system do not differ by more than the desired tolerance margin, the comparable sensor signals can be combined and provided as the output sensor signal 40. If the comparable sensor signals differ by more than the desired tolerance margin, one of the first or second field sensors 20A, 20B is deemed to be faulty.

Figure 12:
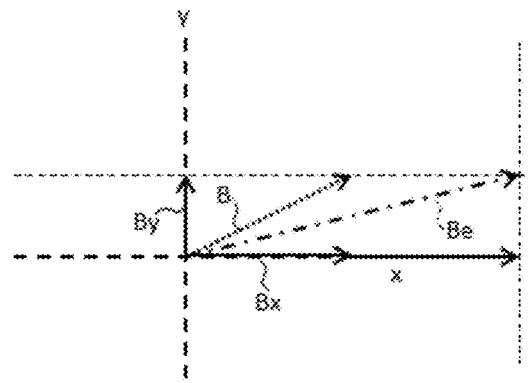
FIG. 12 is a graphic illustration of a field vector having an error in the x-coordinate measurement according to an illustrative embodiment of the present invention.
Figure 13:
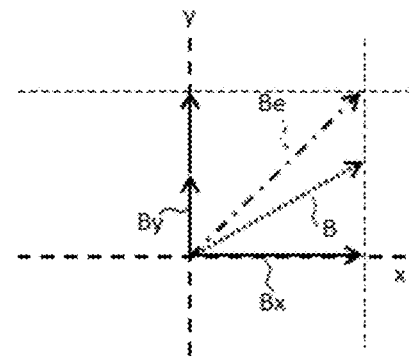
FIG. 13 is a graphic illustration of a field vector having an error in the y coordinate measurement according to an illustrative embodiment of the present invention.

As an illustration, an arbitrary field vector B is illustrated in FIG. 12 having a length in the x dimension that is twice the length in the y dimension where the length represents the field strength in the corresponding dimension. Given a first field sensor 20A in a first orientation and first coordinate system with orthogonal dimensions x, y and a second field sensor 20B in a second orientation and second coordinate system with orthogonal dimensions x', y' rotated by θ=−45 degrees from the first orientation (FIGS. 1 and 9), an error in the x-dimension sensor of the first field sensor 20A results in an erroneous field measurement $B_e$ that differs from the correct field B only in the x dimension in the first coordinate system. Referring to FIG. 13, an error in the y dimension sensor of the first field sensor 20A results in an erroneous field measurement $B_e$ that differs from the correct field B only in the y dimension in the first coordinate system.

Figure 14A:
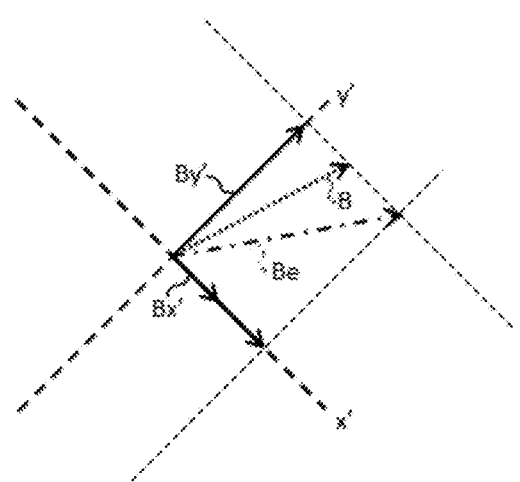
FIG. 14A is a graphic illustration of a field vector having an error in the rotated x' coordinate measurement and FIG. 14B is a graphic illustration of the measured field vector of FIG. 14A in the x, y coordinate system according to an illustrative embodiment of the present invention.
Figure 14B:
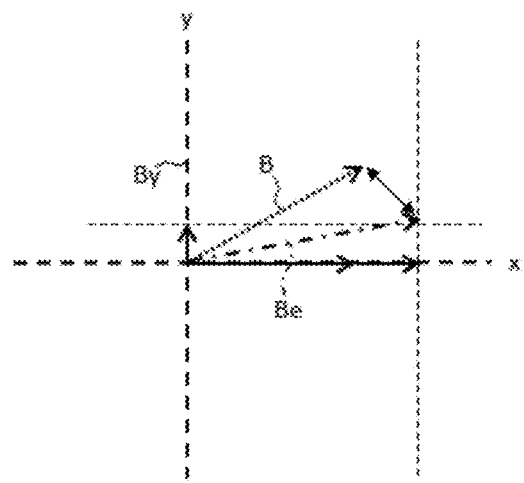

Referring to FIG. 14A, an error in the x' dimension sensor of the second field sensor 20B results in an erroneous field measurement $B_e$ that differs from the correct field B only in the x' dimension in the second coordinate system. When converted into the first coordinate system (FIG. 14B), the erroneous field measurement $B_e$ differs from the correct field B by a direction in the first coordinate system corresponding to the direction of the x' dimension in the second coordinate system (shown with the solid light arrow in FIG. 14B). Referring to FIG. 15A, an error in the y' dimension sensor of the second field sensor 20B results in an erroneous field measurement $B_e$ that differs from the correct field B only in the y' dimension in the second coordinate system. When converted into the first coordinate system (FIG. 15B), the erroneous field measurement $B_e$ differs from the correct field B by a direction in the first coordinate system corresponding to the direction of the y' dimension in the second coordinate system (shown with the solid light arrow in FIG. 15B).

In all of the examples of FIGS. 12, 13, 14A, 14B, 15A, 15B, the angular difference between the first and second coordinate system is θ=−45 degrees (as shown in FIGS. 14A, 15A) and the error is a doubling of the sensor response in the respective dimension, indicated by the two co-linear arrows in the illustrations.

Therefore, given a difference in angle between the first and second coordinate systems of θ, an error vector E=Be−B, if E≠0 and the angle of the vector E in the first coordinate system equals:

0 degrees, the error is in the x-dimension sensor of the first field sensor 20A;

90 degrees, the error is in the y-dimension sensor of the first field sensor 20A;

θ degrees, the error is in the x'-dimension sensor of the second field sensor 20B (−45 degrees in the example of FIGS. 14A and 14B); and θ degrees, the error is in the y'-dimension sensor of the second field sensor 20B (45 degrees in the example of FIGS. 15A and 15B).

In general, the direction of the error vector corresponds to the dimension measured by the faulty field sensor 20, so long as a fault is present only in a single field sensor dimension measurement. In other words, the error vector has a unique component in the direction of the axis (direction) of the measured faulty sensor element 22. The error vector can be expressed as a multiple of the unit vector of the axis (direction) of the faulty sensor measurement. Thus, the control circuit 32 can comprise circuitry that compares the direction of differences between the comparable sensor signals (e.g., Bx, By, Bx', By') to determine a faulty field sensor 20.

According to embodiments of the present invention, the field-sensor device 99 functions to measure fields at the same time as the first and second field sensors 20A, 20B are monitored and diagnosed if a fault is detected, to provide real-time diagnostic signals corresponding to any or both of the first and second field sensor 20A, 20B.

In embodiments of the present invention, a sensor device 99 comprises four or more sensor elements 22 and a controller 30 comprising a control circuit 32 that controls the four or more sensor elements 22 to measure an environmental attribute and produce two or more values corresponding to the measurement and related to the environmental attribute. The control circuit 32 compares the values to determine a fault. In general, each value is obtained from a set of the four or more sensor elements 22 and each set includes at least one same sensor element 22. Each set includes at least one different sensor element 22 not included in the other sets or, alternatively, the sets measure the environmental attribute in different orientations. Another option is that both each set includes at least one different sensor element 22 not included in the other sets, and the sets measure the environmental attribute in different orientations.

For example, the four or more sensor elements 22 comprise a first set of sensor elements 22 and a second set of sensor elements 22. The first set of sensor elements 22 includes at least one sensor element 22 that is also in the second set of sensor elements 22. Thus the intersection of the first set and second set includes at least one same sensor element 22 included in common (so that the first and second sets are not disjoint). The first and second sets can be considered subsets of the set of four or more sensor elements 22.

In some embodiments the first set of sensor elements 22 includes at least one sensor element 22 that is not in the second set of sensor elements 22 so that the first set and the second set are not the same set and do not include all of the same sensor elements 22. Rather the first set and the second set include different, overlapping combinations of sensor elements 22. Thus, in these embodiments, the union of the first set with the second set results in a set that is larger than either the first set or the second set.

In other embodiments the first set and the second set include the same sensor elements 22 (so that the union of the first and second sets is at least equivalent to either the first or second set, but not necessarily both) but the control circuit 32 uses the sensor elements 22 to measure the environmental attribute in different orientations (different coordinate systems). Thus, in either of the embodiments the values provide different measurements of the same environmental attribute and can be compared to determine a fault, if one exists. If the measurement values are the same (in a common coordinate system) no fault is detected.

In embodiments of the present invention the first and second sets of sensor elements 22 each include at least three sensor elements 22 and the three sensor elements 22 are not arranged in a common line (i.e. they are not co-linear), for example the three sensor elements 22 are arranged to form the corners of a triangle. Thus, measurements using the at least three sensor elements 22 can produce a vector including a magnitude and direction in a coordinate system corresponding to the environmental attribute measurement.

The control circuit 32 controls the first set of sensor elements 22 to measure the environmental attribute and produce a first value related to the environmental attribute and controls the second set of sensor elements 22 to measure the environmental attribute and produce a second value related to the environmental attribute. Thus, the first and second sets of sensor elements 22 each produce a value corresponding to the same environmental attribute using different sets of sensor elements 22 or using different coordinate systems. Each of the two or more values is obtained from a different combination or orientation of at least three non-co-linear sensor elements 22. The control circuit 32 compares the values to determine if the values (e.g., the first and second values) match and, if the values do not match, determines a fault. In embodiments of the present invention, the values are vectors and the comparison of the two values can include a comparison of the magnitudes of the values only, a comparison of the angles of the values only or a comparison of both the magnitudes of the values and the angles of the values. In other embodiments the compared values are information derived from the vectors, for example magnetic ratios or magnetic field direction. In some embodiments the measurement direction of the sensor elements in the first set are not co-linear or the measurement direction of the sensor elements in the second set are not co-linear.

In other embodiments the sensor device 99 can comprise more than four sensor elements 22. The additional sensor elements 22 can be co-linear with sensor elements 22 in a pair of sensor elements 22. The sensor device 99 can be a field-sensor device 99, the sensor 20 can be a field sensor 20, the environmental attribute can be a field, such as a magnetic field, and the values can be vectors, such as field vectors, and are used as such in the examples herein. However, the invention is not limited to field sensors 20, fields, magnetic fields or field vectors.

In some embodiments of the present invention a sensor device 99 incorporates a single sensor 20 that comprises at least two pairs of sensor elements 22 (or, equivalently, two sensors 20 each having one pair of sensor elements 22) where the pairs of sensor elements 22 are non-co-linear, for example arranged as illustrated in FIG. 8 at the corners of a quadrilateral, a rectangle or a square. Co-linear means to be on a common line. As intended herein, the pairs of sensor elements 22 are non-co-linear (not co-linear) so that there is no single line that can pass through both sensor elements 22 of both pairs of sensor elements 22. In another embodiment no three sensor elements 22 are co-linear. In some arrangements of the present invention only two of any of the sensor elements 22 are co-linear. However, a line can pass through any two of the sensor elements 22, forming a co-linear pair of sensor elements 22 (since a line is defined by two points in space). Thus, in the embodiment illustrated in FIG. 8, there are six sensor element 22 pairs, A and C (AC), B and D (BD), A and B (AB), C and D (CD), A and D (AD), and B and C (BC), representing line segments including all possible pairs of sensor elements 22.

Pairs of sensor elements 22 can measure an environmental attribute, for example a field magnitude in a direction specified by a line passing through the sensor elements 22. For example, the pair of sensor elements 22 AC arranged in a vertical line can measure the field magnitude in the y direction (dimension). The pair of sensor elements 22 BD arranged in a horizontal line can measure the field magnitude in the x direction (dimension). Referring to FIG. 16, the same arrangement of sensor elements 22 can be used in different combinations to measure field magnitudes in different directions. Thus, the pair of sensor elements 22 AB can measure the field magnitude in the x' direction (dimension), as can the pair of sensor elements 22 CD. Similarly, the pair of sensor elements 22 AD can measure the field magnitude in the y' direction (dimension), as can the pair of sensor elements 22 BC. Each measurement in a direction can be combined with a measurement in another, different direction to produce a value, such as a field vector measurement.

In operation, the control circuit 32 operates the sensor 20 to provide sensor signals from each sensor element 22 A, B, C, D and combines the sensor signals from sensor elements 22 A, C to provide a sensor signal in the y direction, combines the sensor signals from sensor elements 22 B, D to provide a sensor signal in the x direction, combines the sensor signals from sensor elements 22 A, B to provide a sensor signal in the x' direction and combines the sensor signals from sensor elements 22 A, D to provide a sensor signal in the y' direction. The control circuit 32 can also or instead combine the sensor signals from sensor elements 22 C, D to provide a sensor signal in the x' direction, and combines the sensor signals from sensor elements 22 B, C to provide a sensor signal in the y' direction. Thus, two sensor signals in each of the directions x' and y' can be determined. Pairs of sensor signals from sensor elements 22 defining lines having different directions can produce values such as field vectors that can be converted into a common coordinate system, as described above.

As with the embodiments comprising two sensors 20, if the values in the x, y coordinate system match, within a pre-determined tolerance margin, the values in the x', y' coordinate system, the values can be reported as representing the sensed field. However, if the values do not match (within the pre-determined tolerance margin), a fault in the sensor device 99 is determined and can be reported.

In some embodiments of the present invention the sensor 20 has four sensor elements arranged as two pairs of sensor elements 22, the two pairs in a non-co-linear arrangement. An equivalent structure comprises two sensors 20, each having a pair of sensor elements 22, where the two pairs of sensor elements 22 are not co-linear. A distinction between a sensor 20 having four sensor elements 22 and two sensors 20 each having a pair of sensor elements 22 is arbitrary and such embodiments are included in the present invention.

As shown in FIG. 16 and as described above, the pairs of sensor elements 22 can be used by the control circuit 32 to determine an x-direction field measurement value (x value) using sensor elements 22 D, B, a y-direction field measurement value (y value) using sensor elements 22 A, C, a first x'-direction field measurement (first x' value) using sensor elements 22 A, B, a second x'-direction field measurement (second x' value) using sensor elements 22 D, C, a first y'-direction field measurement (first y' value) using sensor elements 22 D, A, and a second y'-direction field measurement (second y' value) using sensor elements 22 C, B. (The first and second measurement designations are arbitrary and can be reversed.) The sensor signals can be obtained by separately measuring each sensor element 22 or by providing switches that turn the different sensor elements 22 off or on and making sequential measurements with different switch settings. Alternatively, analog or digital signal processing can be employed to distinguish the separate sensor element 22 measurements.

Figures 18A, 18B:
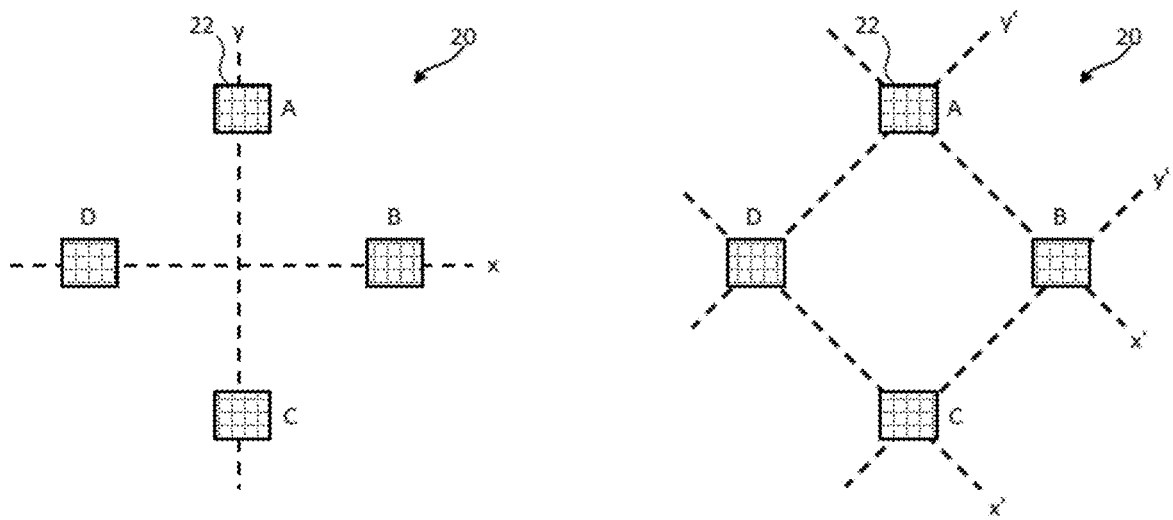
FIGS. 18A and 18B are graphic illustrations of sensor element pairs according to illustrative embodiments of the present invention.

Measurements made by pairs of sensor elements 22 that define lines extending in different directions, for example orthogonally, can be combined in a common coordinate system to form field vectors (having a field magnitude and direction) specifying a measured field, such as a magnetic field. For example, measurements made by sensor elements 22 AC can be combined with measurements made by sensor elements 22 BD to form a field vector in the x, y coordinate system as shown in FIG. 18A. Referring to FIG. 18B, measurements made by sensor elements 22 AB can be combined with measurements made by sensor elements 22 AD to form a field vector in the x', y' coordinate system, measurements made by sensor elements 22 AB can be combined with measurements made by sensor elements 22 BC to form a field vector in the x', y' coordinate system, measurements made by sensor elements 22 AD can be combined with measurements made by sensor elements 22 CD to form a field vector in the x', y' coordinate system, and measurements made by sensor elements 22 BC can be combined with measurements made by sensor elements 22 CD to form a field vector in the x', y' coordinate system. Therefore, a first field vector can be determined by combining the x, y values, a second field vector can be determined by combining the first x' and first y' values, a third field vector can be determined by combining the first x' and second y' values, a fourth field vector can be determined by combining the second x' and first y' values, and a fifth field vector can be determined by combining the second x' and second y' values. Any one or more of the first, second, third, fourth and fifth field vectors can be converted into a common coordinate system, as described above. In this embodiment the same sensor elements 22 are used for two or more value measurements but one value (FIG. 18A) is obtained in the x, y coordinate system and the other values (FIG. 18B) are obtained in the x', y' coordinate system with any combination of the x' and y' measurements.

If all five field vectors (or any combination of field vectors when converted into a common coordinate system, if necessary, and within the predetermined tolerance range) match, a field measurement signal can be output that combines any one or any combination of the first, second, third, fourth, or fifth field vectors. If a single sensor element 22 is faulty (produces a faulty measurement value), however, the field measurements incorporating the faulty sensor element 22 will not match the field measurements that do not incorporate the faulty sensor element 22. For example, if sensor element 22 B is faulty, then the field vectors incorporating measurements from sensor element 22 B will likewise be faulty. In this example, the first, second, third, and fifth field vectors all include a measurement value from sensor element 22 B and will therefore produce a faulty value if sensor element 22 B is faulty. Only the fourth field vector, including measurements from sensor elements 22 A, C, and D, will be correct.

Figure 19A:
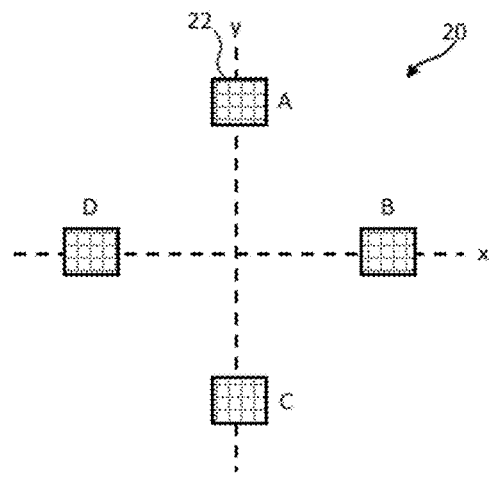
FIGS. 19A and 19B are graphic illustrations of sensor element pairs according to illustrative embodiments of the present invention
Figure 19B:
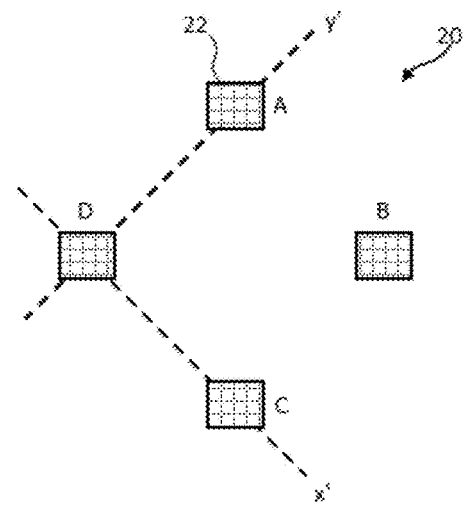
Figure 20A:
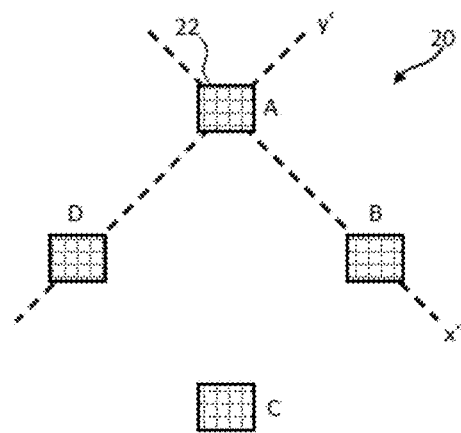
FIGS. 20A, 20B, 20C and 20D are graphic illustrations of sensor element pairs according to illustrative embodiments of the present invention.
Figure 20B:
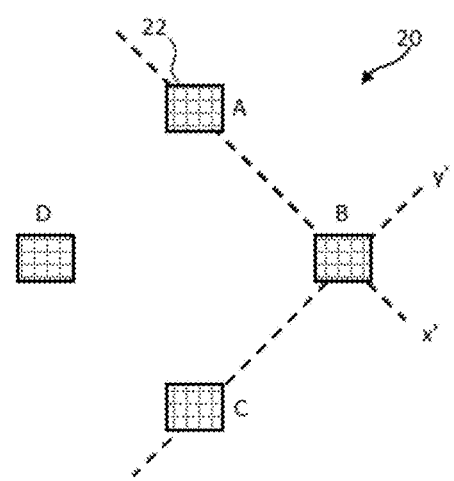
Figures 20C, 20D:
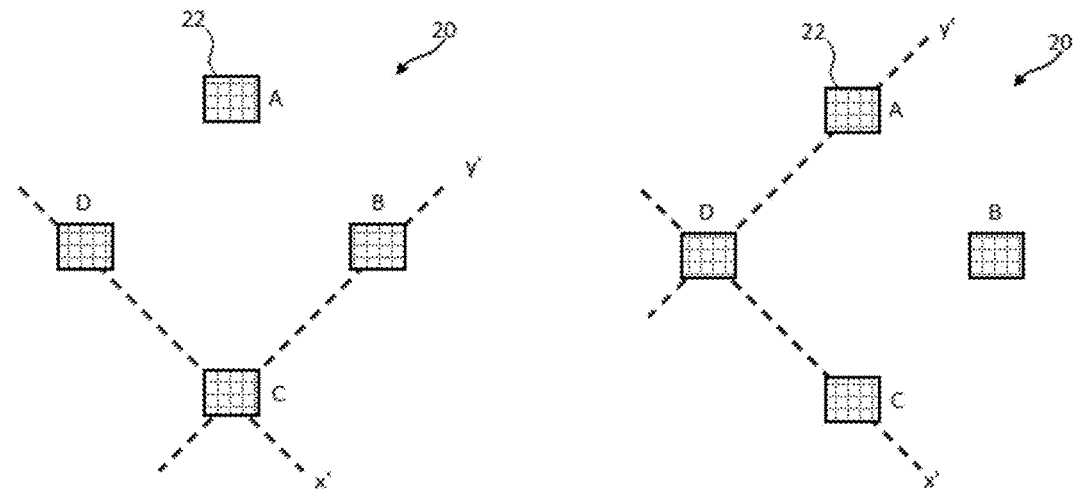

Different pairs of field vector measurements can be compared in various embodiments of the present invention. For example, referring to FIG. 19A, a field vector determined by the sensor element 20 pairs AC, BD connected by the dashed lines provides a first value (in the x, y coordinate system). Referring to FIG. 19B, a field vector determined by the sensor element 20 pairs AD, DC connected by the dashed lines provides a second value (in the x', y' coordinate system. The first and second values can be converted into a common coordinate system (e.g., by converting the second value to the coordinate system of the first value, or vice versa) and compared to determine whether a fault exists in the sensor device 99. In this case, the set of sensor elements 22 used in FIG. 19A includes all of the sensor elements 22 used in FIG. 19B, but the measurements are made in different coordinate systems.

Referring to FIGS. 20A, 20B, 20C and 20D, four different combinations of three non-co-linear sensor elements 22 are illustrated, all of which determine orthogonal measurements providing a field vector value and all of which are in the same coordinate system, (x', y'). Any two of the four different combinations has at least one sensor element 22 in common and at least one sensor element 22 that is not in common. For example, the configurations of FIGS. 20A and 20B have sensor elements 22 A and B in common and sensor elements 22 C and D are not in common. Any two of the four different combinations of FIGS. 20A, 20B, 20C and 20D can provide the first and second values that are compared to determine a fault, if present. In further embodiments of the present invention, more than two values are provided and compared to determine if a fault is present in the sensor device 99.

Therefore, in an embodiment of the present invention a sensor device 99 comprises four sensor elements 22. At least two of any of the sensor elements 22 define a first line in a first coordinate system and at least two of any of the sensor elements 22 define a second line different from the first line in a second coordinate system different from the first coordinate system. If more than four sensor elements 22 are provided in the sensor device 99, the additional sensor elements 22 can be co-linear in either or both of the first and second coordinate systems. A controller 30 comprises a control circuit 32, where the controller 30 uses the control circuit 32 to control the sensor elements 22 to measure an environmental attribute, for example a field such as a magnetic field, and produce more than two corresponding values, for example field vectors, wherein each of the more than two values is obtained from a different combination of at least two sensor elements 22, convert the values (e.g., field vectors) into a common coordinate system, compare the values and determine a fault.

In a further embodiment of the present invention the control circuit 32 is used to measure a first field value in a first direction using a first pair of sensor elements 22, a second field value in a second direction different from the first direction using a second pair of sensor elements 22 different from the first pair of sensor elements 22, a third field value in a third direction different from the first and second directions using a third pair of sensor elements 22 different from the first and second pairs of sensor elements 22, a fourth field value in a fourth direction different from the first, second and third directions using a fourth pair of sensor elements 22 different from the first, second and third pairs of sensor elements 22, a fifth field value in the third direction using sensor elements 22 different from those used to measure the third field vector, and a sixth field vector in the fourth direction using sensor elements 22 different from those used to measure the fourth field vector.

Figure 17:
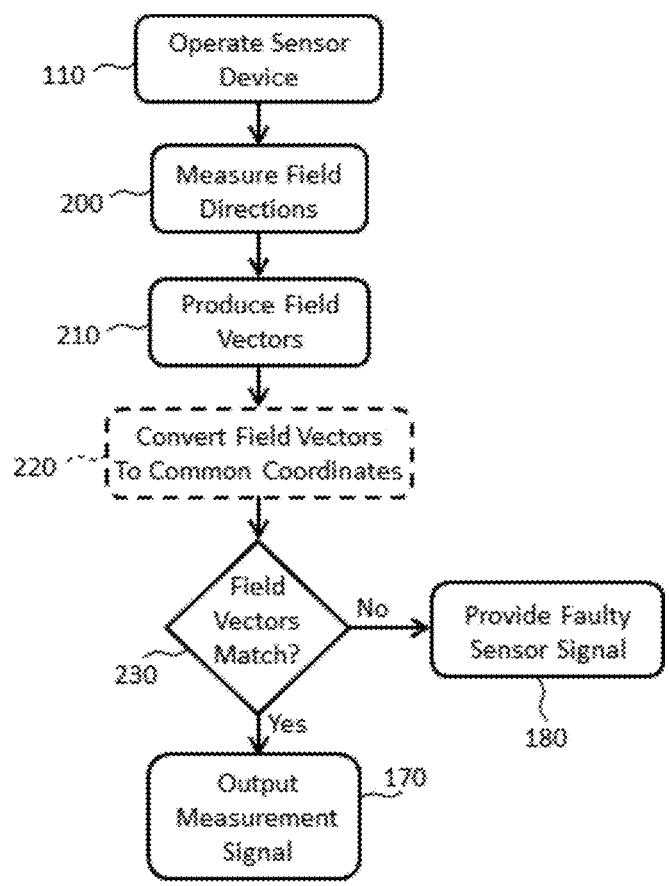
FIG. 17 is a flow graph according to an illustrative embodiment of the present invention.

Referring to FIG. 17, the control circuit 32 operates the sensor device 99 in step 110 and measures the environmental attribute (field) in the same and different directions using the sensor element 22 pairs in step 200 to produce values (e.g., field vectors) in step 210. The control circuit 32 further converts the values (e.g., field vectors) into a common coordinate system in step 220, if necessary. The values (e.g., field vectors) are compared using the control circuit 32 to determine if they match in step 230. If the environmental attribute (field) measurements match within a pre-determined tolerance range, an environmental attribute measurement signal is output in step 170, where the measurement signal can be a signal derived from any one of or combination of the first, second, third, fourth and fifth field vectors or their converted equivalents. Alternatively, a fault is determined if the field vectors in a common coordinate system are not all the same within the predetermined tolerance range and a faulty sensor signal output (step 180).

Figure 21:
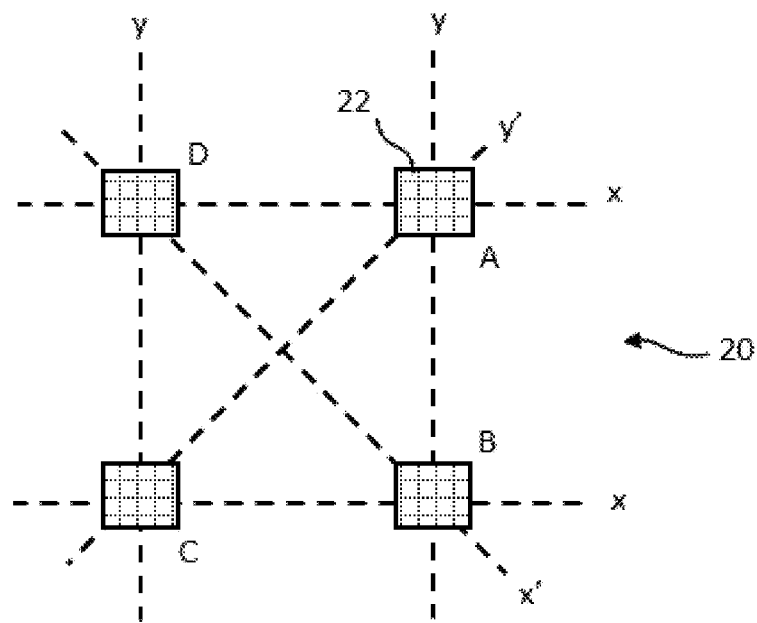
FIG. 21 is a graphic illustration of sensor element pairs in another configuration and coordinate systems according to an illustrative embodiment of the present invention.

Referring to FIG. 21, the same process and analysis can be applied to other arrangements of sensor elements 22. The coordinate system designations are arbitrary, as are the sensor element 22 labels. So long as the various combinations of sensor element 22 pairs can provide a correct value and the values analyzed to determine a faulty sensor element 22, the methods described herein can be employed in a sensor device 99. Furthermore, a sensor device 99 of the present invention can incorporate more than four sensor elements 22 and the control circuit 32 can control the sensor elements 22 in pairs to make similar environmental attribute measurements in different directions that can provide a set of values, some of which can be redundant.

Embodiments of the present invention can also provide a gradient measurement, for example a field gradient such as a magnetic field gradient. As noted above, two different measurements can be made in the x' coordinate system and two different measurements can be made in the y' coordinate system. If the sensor device 99 is determined to be without fault (the different measurements provide a common vector in a common coordinate system), because the sensor elements 22 are spatially offset, the different measurements in each of the x' and y' coordinate systems can be combined to provide a gradient measurement. For example, the AB measurement can be compared with the CD measurement to determine a difference that can be attributed to a gradient in the y' direction for the measured environmental attribute. Similarly, the AD measurement can be compared with the BC measurement to determine a difference that can be attributed to a gradient in the x' direction for the measured environmental attribute. Note however, that a gradient should not be confused with errors in the sensor elements 22 or their measurements.

If a sensor device 99 has eight sensor elements 22 (as shown in FIG. 9) or, equivalently, two field-sensor devices 99 are provided with a spatial offset and their sensor element 22 measurements combined, a gradient can also be determined in the x and y directions. For example, presuming a labelling system for the additional four sensor elements 22 from the upper left to the lower right of E, F, G, and H, the EG measurements can be compared to the GH measurements to determine a gradient in the x direction and the EF measurements can be compared to the GH measurements to determine a gradient in the y direction.

Embodiments of the present invention can be constructed by providing a substrate and mounting the first or second field sensor 20A, 20B and controller 30 as integrated circuits on the substrate. The integrated circuits can be disposed on the substrate surface using pick-and-place technologies or by micro-transfer printing them from corresponding source wafers onto the substrate surface. Alternatively, the substrate surface can be or include a semiconductor layer and one or more or any portion of each of the first or second field sensor 20A, 20B and controller 30 are formed in the semiconductor layer and electrically connected with any integrated circuits disposed on the substrate surface using wires 12 on the substrate surface, for example by using photolithographic or printed circuit board methods and materials. Alternatively, the control circuits 32 or field sensors 20 can be photolithographically defined in a semiconductor substrate.

The substrate can be one of many substrates with one or more surfaces capable of supporting or receiving the first or second field sensor 20A, 20B and controller 30, for example a glass, plastic, ceramic or semiconductor substrate with two opposing relatively planar and parallel sides. The substrate can have a variety of thicknesses, for example from 10 micron to several millimeter. The substrate can be a portion or surface of another device and can include electronic circuitry.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A sensor device, comprising:
   four or more sensor elements; and
   a controller comprising a control circuit arranged to control said four or more sensor elements to measure an environmental attribute and arranged to produce two or more values related to said environmental attribute and to compare said two or more values to determine a fault,
   wherein each value is obtained from a set of said four or more sensor elements and each set includes at least one same sensor element, and
   wherein each set includes at least one different sensor element not included in the other sets or the sets are arranged to measure said environmental attribute in different orientations, or both.

2. The sensor device as in claim 1, wherein:
   said four or more sensor elements comprise a first set of sensor elements and a second set of sensor elements, wherein said first set includes at least one sensor element that is also in said second set,
   said control circuit of said controller is arranged to control said first set of sensor elements to measure said environmental attribute in a first orientation and produce a first value related to said environmental attribute, to control said second set of sensor elements to measure said environmental attribute in a second orientation and produce a second value related to said environmental attribute, and to compare said first and second values to determine a fault,
   wherein said first set includes at least one sensor element that is not in said second set or wherein said first orientation is not the same as said second orientation, or both.

3. The sensor device as in claim 2, wherein said first and second values are measured in different coordinate systems and wherein said control circuit is arranged to convert one or more of said first and second values into a common coordinate system.

4. The sensor device as in claim 1, wherein said values are field vectors, information derived from said field vectors, magnitude values, angle values or both magnitude and angle values.

5. The sensor device as in claim 1, wherein said values are magnetic field vectors, magnetic ratios derived from said magnetic field vectors, or magnetic direction derived from said magnetic field vectors.

6. The sensor device as in claim 2, wherein said sensor elements in said first set are not co-linear or said sensor elements in said second set are not co-linear or wherein said measurement direction of said sensor elements in said first set are not co-linear or said measurement direction of said sensor elements in said second set are not co-linear.

7. The sensor device as in claim 4, wherein said control circuit is arranged to combine measurements from pairs of sensor elements defining lines with different directions to produce each field vector.

8. The sensor device as in claim 7, wherein said different directions are orthogonal.

9. The sensor device as in claim 1, wherein said four sensor elements are arranged in a quadrilateral, a rectangle, a square or a circular arrangement.

10. A method of operating a sensor device as in any of the previous claims, comprising:
    using said control circuit to measure an environmental attribute with said sensor elements,
    combining the sensor element measurements to produce more than two values representing said environmental attribute, and
    comparing said values to determine a single correct value.

11. The method as in claim 10, wherein said two values represent measurements in different coordinate systems and comprising converting one or more of said values into a common coordinate system.

12. The method as in claim 10, comprising combining measurements from pairs of sensor elements.

13. The method as in claim 10, comprising combining sensor element measurements to produce a field vector using said control circuit.

14. The method as in claim 10, comprising combining measurements from pairs of sensor elements defining lines with different directions to produce said values using said control circuit.

15. The method as in claim 14, wherein said different directions are orthogonal.

* * * * *